Feb. 9, 1971 K. H. K. HELDT 3,561,829

MEANS FOR MAINTAINING THE CLEARANCE IN ROLLING BEARINGS

Filed Dec. 6, 1968 2 Sheets-Sheet 1

INVENTOR:
KARL HELGE KONSTANTIN HELDT

BY Howson & Howson
ATTYS.

MEANS FOR MAINTAINING THE CLEARANCE IN ROLLING BEARINGS

Filed Dec. 6, 1968 2 Sheets-Sheet 2

INVENTOR:
KARL HELGE KONSTANTIN HELDT
BY
Howson & Howson
ATTYS.

United States Patent Office 3,561,829 Patented Feb. 9, 1971

3,561,829

MEANS FOR MAINTAINING THE CLEARANCE IN ROLLING BEARINGS

Karl Helge Konstantin Heldt, Savedalen, Sweden, assignor to Aktiebolaget Svenska Kullagerfabriken, Goteborg, Sweden, a corporation of Sweden Filed Dec. 6, 1968, Ser. No. 781,898
Claims priority, application Sweden, Dec. 7, 1967, 16,789
Int. Cl. F16c *33/00*
U.S. Cl. 308—189 1 Claim

ABSTRACT OF THE DISCLOSURE

A device for maintaining the clearance in rolling bearings subjected to varying temperatures contains at least two annular members made of materials having different heat expansion coefficients. These members engage each other along a conical surface and due to the different expansions of the members the breadth of the pair of members will vary as the temperature changes. One of the members abuts against a ring of the bearing, and the other member abuts against a support, which may be regarded as fixed in relation to the ring, thus permitting compensation movements to take place.

The present invention refers to means for maintaining the clearance in rolling bearings by the aid of adjustable annular members made of materials having different heat expansion coefficients cooperating with at least one of the ring members of the bearings.

With a previously known embodiment of this kind two adjusting devices have been utilized between two rolling bearings, one of these devices abutting against the inner ring members of both bearings, whereas the other adjusting device abuts against the outer ring members of the bearings. Depending upon which of the ring members of the bearing is expected to be subjected to the highest temperature the adjusting device cooperating therewith is made of a material having a big heat expansion coefficient, whereas the adjusting device abutting against the other ring member of the bearing is made of a material having a low heat expansion coefficient. The compensation for the increased axial clearings in the bearings, which is brought about by an increased temperature, is only possible due to expansion in the axial direction. Out of practical considerations it is, however, very difficult to select the adjusting devices to each possible use as such a selection is possible only by a choice of the expansion coefficient of the material. This means that a large number of devices of different materials must be kept available, and having in mind the large number of rolling bearings available and the utilization thereof for different purposes this is almost practically impossible.

The means according to the invention may be regarded as a development of this previously known system, but it is modified in such a manner that it has considerable advantages compared to the old arrangement above described with respect to manufacturing and to working. The invention is characterized by that the means contains at least two annular members having matching conical surfaces, being internal of one member at external on the other, said members being in direct contact with each other along said surfaces.

Figure 1:
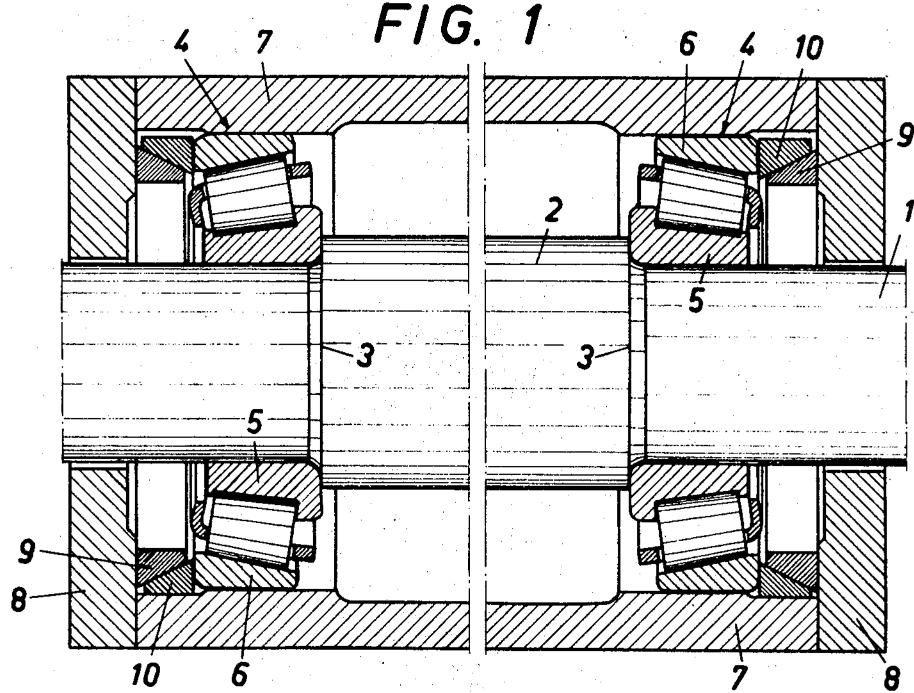
FIG. 1 shows a longitudinal section through a bearing arrangement containing two conical roller bearings, which by a device according to the invention are maintained in position in relation to a stepped portion of a shaft.

With the embodiment shown in FIG. 1 a shaft having a stepped portion 2 is denoted by 1. A conical roller bearing 4 is arranged at each end of the stepped portion 2 in direct contact with the end surface 3 thereof. Each roller bearing 4 consists of an inner ring member 5 and an outer ring member 6. The latter is mounted in a housing 7 which is closed by a lid 8 at each end. In the space between an outer ring member 6 and a lid 8 an adjusting device consisting of two annular members 9 and 10 is located, of which members the first mentioned is provided with an internal and the second one with an external conical surface said conical surfaces being in contact with each other. Such a pair of interconnected annular members has a breadth across its radially outwardly edges, which is bigger than the breadth of each individual ring. The excess measure corresponds at least to the maximum axial displacement necessary to compensate the changes in the bearing clearings. The annuli 9 and 10 are made of materials having different expansion coefficients. The annulus having the bigger coefficient, the active member, in this case 10 is preferably made of aluminum, brass, manganese or the like, whereas the passive member 9 is made of steel, Invar steel, or the like. Depending upon the location of the members in relation to each other an increase of the breadth of the pair combination is brought about due to temperature variations. As shown in FIG. 1 an annulus 10, which is provided with an internal conical surface and is made of material with bigger expansion coefficient than the inner annulus 9 will increase diametrically more than the latter 9. The annular will thereby be displaced in relation to each other sliding along the conical surface to move towards each other. The total breadth of the pair combination will decrease and the outer ring member 6 of the bearing will be adjusted in such a manner that a detrimental pressure in the bearing is avoided. By a suitable choice of the cone angle in relation to the expected temperature variation any desired breadth can be maintained.

Figure 2:
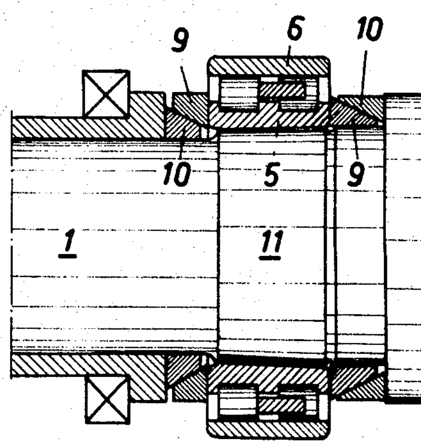
FIG. 2 shows two-row cylindrical roller bearings mounted on a shaft, the axial clearing being adjusted by compensating means located to each side thereof.

With the embodiment according to FIG. 2 the two-row rolling bearing has an inner ring 5 mounted on conical portion 11 of shaft 1. To each side of the bearings an adjusting means according to the invention is fitted. The pair combination located at the small end of the conical portion is adapted to exert an outwardly directed force when the breadth thereof is increased. The pair combination at the big end of the conical portion 4 is arranged in such a manner that the outer annular member 10 has a bigger coefficient of expansion than the inner member 9 in such a manner that the diameter of annulus 10 will increase with increasing temperature in such a manner that the inner annulus 9, which does not follow this expansion, may be pushed in below the outer annulus 10 whereby the breadth of the pair combination will be diminished. By this arrangement it is possible to adjust the axial position of the bearing ring in relation to the shaft, which prevents the radial clearance in the bearings from being too small due to increased temperature.

Figure 3:
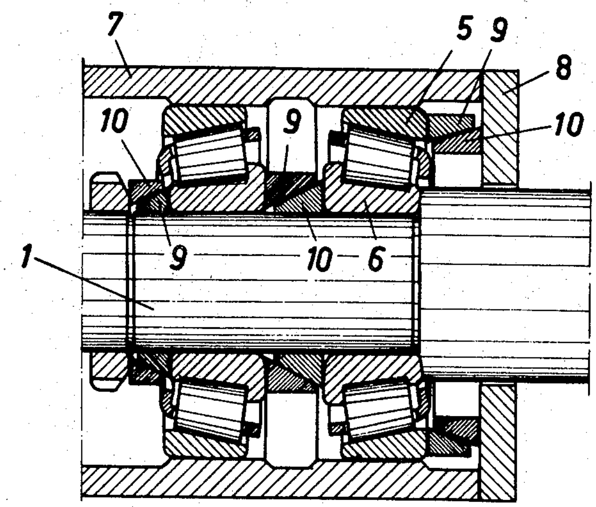
FIG. 3 shows a section through a bearing arrangement where the inner ring member as well as the outer ring member thereof are provided with adjusting means.

The arrangement according to FIG. 3 shows a combination of the means illustrated in FIGS. 1 and 2 adapted to adjust axial clearance at the inner as well as the outer bearing ring members.

Figure 4:
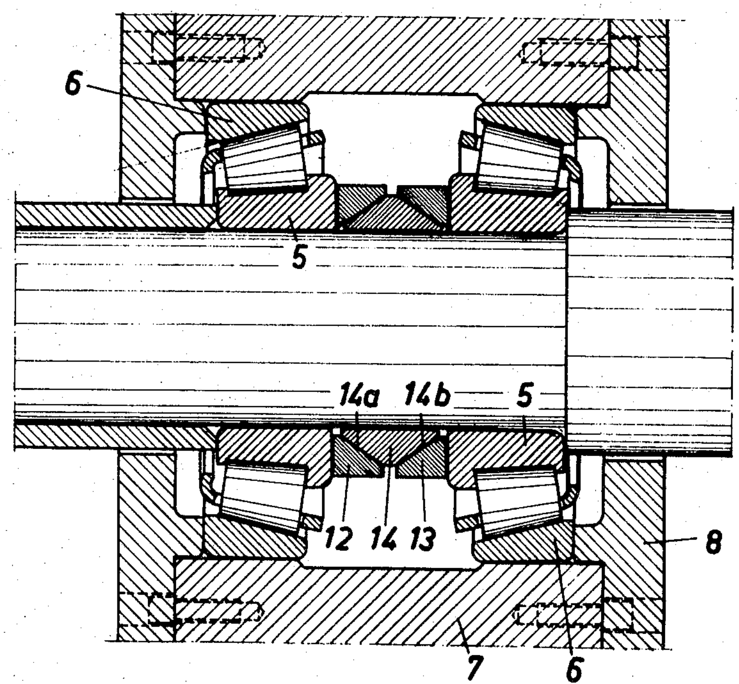
FIG. 4 shows a further embodiment of a bearing arrangement, where the clearance is compensated by means of three cooperating annular members according to the invention.

The embodiment shown in FIG. 4 differs from those of the previously described figures by the adjusting means being composed of three annular members 12, 13 and 14, of which the intermediate one has two conical surfaces 14*a* and 14*b* converging toward each other, and cooperating with rings 12 and 13 each having a single conical surface. If it is desirable to obtain a decreasing distance between two conical rolling bearings the members 12 and 13 are made of material having a bigger expansion coefficient compared to the material in the member 14 having the twin conical surface. If on the other hand an increasing distance between the bearings is desired the twin conical member 14 is made of a material having the bigger expansion coefficient than the outer simple rings 12 and 13, respectively.

The invention is not limited to the embodiment shown and described, but the annular members may be designed as washers having a bigger extension in the radial direction than the axial direction.

What I claim is:

1. In combination, a bearing assembly mounted on a shaft member or the like, said bearing assembly comprising inner and outer rings spaced apart to define an annular space for a plurality of rolling elements, said inner ring and shaft having complementary tapered confronting conical portions, adjusting means for axially positioning the inner ring in relation to the shaft to prevent radial clearance in the bearing assembly from being too small due to increased temperature consisting of first and second pairs of annular members mounted adjacent opposite axial end faces of the inner ring, said first and second pairs of annular members having interengaging complementary tapered surfaces, the outer annular member of said first pair having a greater coefficient of expansion than said inner member and the inner annular member of said second pair having a greater coefficient of expansion than the outer annular member of said second pair.

References Cited

UNITED STATES PATENTS

| | | | |
|---|---|---|---|
| 3,317,258 | 5/1967 | Hermann ---------- | 308—207 |

FOREIGN PATENTS

| | | | |
|---|---|---|---|
| 66,729 | 1940 | Czechoslovakia ---- | 308—207.1 |
| 67,729 | 1940 | Czechoslovakia ---- | 308—207.1 |
| 1,086,388 | 10/1959 | Germany ---------- | 308—189 |

M. CARY NELSON, Primary Examiner